(12) United States Patent
Marais et al.

(10) Patent No.: US 7,523,334 B2
(45) Date of Patent: Apr. 21, 2009

(54) WAKE-UP SYSTEM FOR STATIONS ASSOCIATED FOR IMPLEMENTING AT LEAST A DISTRIBUTED FUNCTION, IN PARTICULAR IN A MOTOR VEHICLE

(75) Inventors: Jean-Michel Marais, Nanterre (FR); Nicolas Henri, Paris (FR); Yannick Hildenbrand, Verneuil sur Seine (FR); Lionel Joffrain, Paris (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 1393 days.

(21) Appl. No.: 10/482,574

(22) PCT Filed: Jul. 2, 2002

(86) PCT No.: PCT/FR02/02309

§ 371 (c)(1),
(2), (4) Date: Dec. 29, 2003

(87) PCT Pub. No.: WO03/005215

PCT Pub. Date: Jan. 16, 2003

(65) Prior Publication Data
US 2004/0174909 A1   Sep. 9, 2004

(30) Foreign Application Priority Data
Jul. 6, 2001   (FR)   .................................. 01 09034

(51) Int. Cl.
*G06F 1/26* (2006.01)
(52) U.S. Cl. ........................................ 713/324; 701/36
(58) Field of Classification Search .................. 701/36; 713/324
See application file for complete search history.

(56) References Cited

U.S. PATENT DOCUMENTS

| 5,940,366 A | 8/1999 | Moriue et al. |
| 6,728,892 B1 * | 4/2004 | Silvkoff et al. ............... 713/320 |
| 2005/0131556 A1 * | 6/2005 | Trappeniers et al. .......... 700/22 |

FOREIGN PATENT DOCUMENTS

EP   1 050 998   11/2000

OTHER PUBLICATIONS

Microchip Technology, "LIN Protocol Implementation Using PICmicro MCUs," AN729, 2000.*

* cited by examiner

*Primary Examiner*—Thomas Lee
*Assistant Examiner*—Albert Wang
(74) *Attorney, Agent, or Firm*—Nicolas E. Seckel

(57) ABSTRACT

In this wakeup system for stations interconnected by an information transmission network in particular for a motor vehicle, in which the stations need to pass from a standby state or an OFF state to an awake state in order to exchange information relating to the distributed function, all of the stations are connected to a single line for transmitting a station wakeup signal, at least some of the stations include means for generating a wakeup signal on said line in order to cause the other stations to take up their awake state, and means for sending information relating to the distributed function over the information transmission network, and at least some of the stations include means for analyzing the information on the information transmission network in order to determine whether they are concerned by the information and thus by the corresponding distributed function, so as to remain in the awake state or else return to the standby state or the OFF state.

6 Claims, 2 Drawing Sheets

WAKE-UP SYSTEM FOR STATIONS ASSOCIATED FOR IMPLEMENTING AT LEAST A DISTRIBUTED FUNCTION, IN PARTICULAR IN A MOTOR VEHICLE

The present invention relates to a station wakeup system.

More particularly, the invention relates to such a system for waking up stations associated for implementing at least one distributed function and interconnected by an information transmission network in particular for a motor vehicle, in which the stations need to pass from a standby state or an OFF state to an awake state in order to exchange information relating to the distributed function.

Wakeup systems of this type already exist in the prior art in which one line is used per distributed function in order to transmit a wakeup signal, which line extends between a station and one or more other stations associated therewith for implementing the function.

It will then be understood that each distributed function requires a respective line to be provided for transmitting the corresponding wakeup signal between the various associated stations, and that these lines are provided as a function of specific requirements on a case-by-case basis.

The diversity of systems and functions means that such wakeup signal transmission lines are all different and that they use different protocols, even though the functional requirement is identical, namely remotely waking up one or more remote stations.

Consequently, the hardware and software interfaces installed in the stations are also different.

That has the effect of multiplying the number of input/output interfaces of a station, assuming the station is involved in a plurality of distributed functions with different stations.

The prior art also proposes wakeup systems using information transmission networks of the controller area network (CAN), etc. . . . , type, for example.

Nevertheless, those structures also present a certain number of drawbacks.

A station is woken up by such an information transmission network as soon as a message is detected on the network by the protocol managers associated with the stations.

Any message therefore triggers the process of waking up all of the stations.

Two stations performing a distributed function and using the network to exchange information cause all of the stations to be woken up repeatedly whenever a message passes over the network, and this is not acceptable, in particular in terms of electricity consumption.

The object of the invention is thus to solve these problems.

To this end, the invention provides a system for waking up stations associated for implementing at least one distributed function and interconnected by an information transmission network in particular for a motor vehicle, in which the stations need to pass from a standby state or an OFF state to an awake state in order to exchange information relating to the distributed function, the system being characterized in that all of the stations are connected to a single line for transmitting a station wakeup signal, in that at least some of the stations include means for generating a wakeup signal on said line in order to cause the other stations to take up their awake state, and means for sending information relating to the distributed function over the information transmission network, and in that at least some of the stations include means for analyzing the information on the information transmission network in order to determine whether they are concerned by the information and thus by the corresponding distributed function, so as to remain in the awake state or else return to the standby state or to the OFF state.

The invention will be better understood on reading the following description given purely by way of example and made with reference to the accompanying drawings, in which:

FIG. 1 shows an electronic system on board a motor vehicle by way of example.

This system comprises a plurality of stations, six of which are given overall references 1, 2, 3, 4, 5, and 6, and are shown in the figure.

By way of example, these various stations are associated with different functions on board the vehicle, such as distributed functions, for example.

These various stations are also interconnected by an information transmission network given overall referenced 7, acting via interfaces such as the interfaces 8 and 9 of the stations 1 and 4, for example.

This network can be of the CAN, D2B, TTP, SI, etc. . . . type, for example.

These stations can switch from a standby state or an OFF state to an awake state for exchanging information relating in particular to the distributed functions.

As mentioned above, each distributed function requires a line to be provided for transmitting a corresponding wakeup signal between the stations which are associated for implementing the function.

Figure 1:
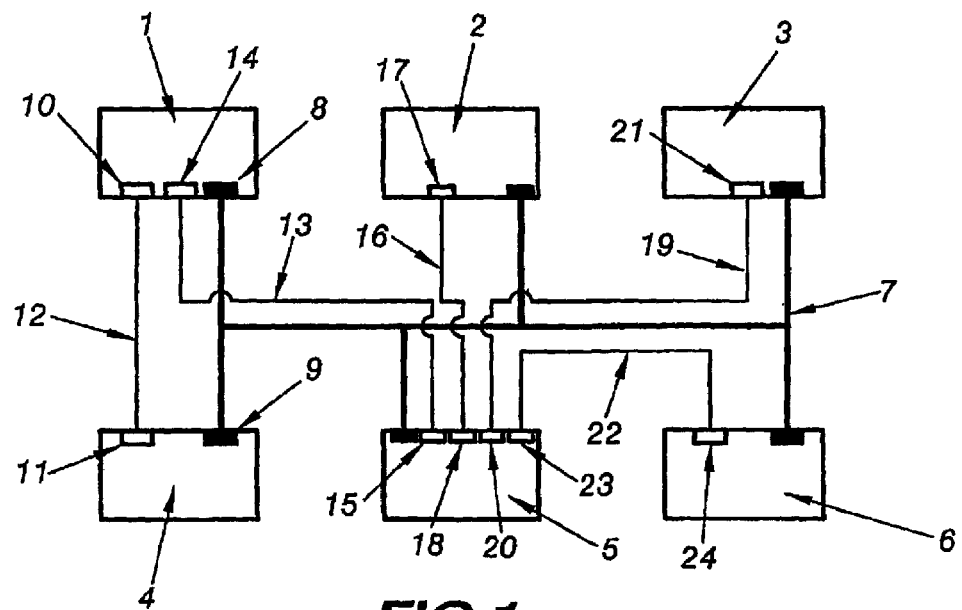
FIG. 1 is a block diagram showing the structure of a prior art wakeup system.

Thus, as can be seen in FIG. 1, stations 1 and 4 are associated for implementing a function, thus requiring respective input/output interfaces 10 and 11 to be installed in these stations with a line extending between the interfaces for transmitting a wakeup signal, the line being given overall reference 12.

Another distributed function is also implemented by stations 1 and 5.

A line given overall reference 13 for transmitting the corresponding wakeup signal thus extends between these two stations, and more particularly between input/output interfaces thereof given respective overall references 14 and 15.

The station 5 is also associated with the station 2 for implementing a distributed function.

A line given overall reference 16 for transmitting the corresponding wakeup signal extends between respective input/output interfaces 17 and 18.

The station 5 is also associated with the station 3 for implementing a distributed function and a line given overall reference 19 for transmitting the corresponding wakeup signal extends between respective input/output interfaces 20 and 21 of the station.

Finally, the station 5 is also associated with the station 6 for implementing a distributed function and a line given overall reference 22 for transmitting the corresponding wakeup signal extends between respective input/output interfaces 23 and 24 of these stations.

It can be seen in the light of this figure that such systems present a certain number of drawbacks.

To solve the above-mentioned problems, and in accordance with the invention, all of these stations are connected to a single line for transmitting a station wakeup signal.

Figure 2:
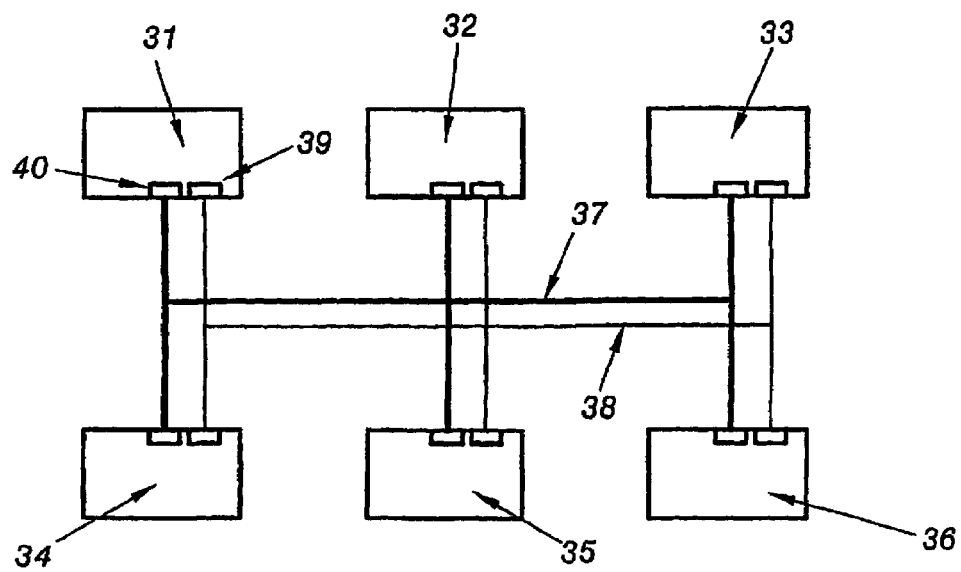
FIG. 2 is a block diagram showing the structure of a system of the invention.

This is shown in FIG. 2 which is a block diagram illustrating the structure of a system of the invention.

FIG. 2 shows an electronic system on board a motor vehicle, for example, comprising a plurality of stations (six of which are shown) designated by overall references 31, 32, 33, 34, 35, and 36. These various stations are interconnected by an information transmission network given overall reference 37, e.g. forming a network of the CAN, D2B, TTP, SI, etc. . . . type.

The single line for transmitting the station wakeup signal is given overall reference 38.

As described in greater detail below, at least some of these stations have means for generating a wakeup signal on this line to cause other stations to switch to their awake state, and means for sending information concerning the distributed function over the information transmission network.

By way of example these variant means are constituted by line and network interfaces given respective overall references 39 and 40 for the stations given overall reference 31.

At least some of the stations also include means for analyzing the information on the information transmission network in order to determine whether they are concerned by the information and thus by the corresponding distributed function, so as to remain in an awake state or otherwise return to a standby state or an OFF state.

These analysis means are likewise formed by the means given reference 40 in FIG. 2.

It can thus be understood that by means of such a structure, when a station seeks to wake up another station in order to implement a distributed function, it sends a wakeup signal over the single line 38 so as to cause all of the other stations to switch from their standby state or their OFF state to their awake state.

The station also sends over the information transmission network 37 information concerning the distributed function.

Once all of the other stations are awake, they analyze this information on the information transmission network in order to enable them to determine whether they are concerned by the corresponding distributed function, so as to remain in an awake state and possibly exchange information with the station that has triggered awakening of the other station, or else return to their standby state or their OFF state if they are not concerned by these functions.

This sequence can be repeated, for example, each time a station requests execution of one or more distributed functions while the other stations are in a standby state or an OFF state.

By way of example, the wakeup signal may be in the form of an electrical pulse of predetermined duration transmitted over the line 38.

The duration of the transmitted electrical pulse is calibrated as a function of the various systems connected to the wakeup line, and this pulse drives the input of the station power supply stage and must therefore be long enough to enable all of the stations to start, initialize, and then switch ON their own power, where necessary.

The line for transmitting the wakeup signal conveys only a command signal.

The stations then have their power supply means available delivering the electricity needed for their proper operation.

By way of example, these power supply means comprise a self-hold mechanism driven under software control to keep the station in question in the awake state if it is concerned by the distributed function.

Figure 3:
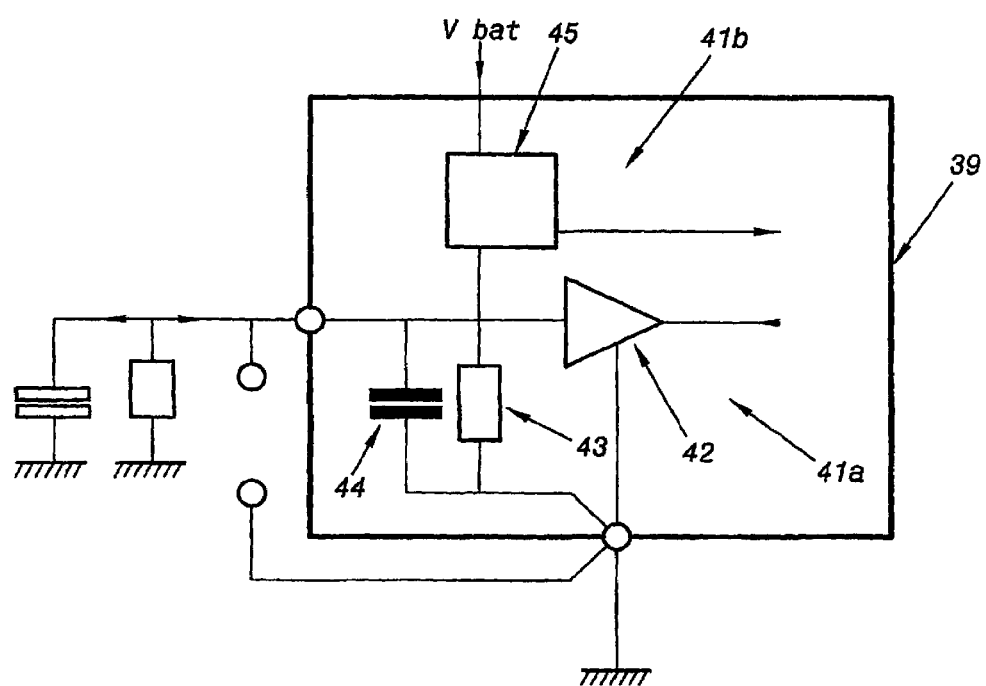
FIG. 3 is an electrical circuit diagram showing an embodiment of a wakeup line interface.

FIG. 3 shows a wakeup line interface given reference 39.

This figure shows a complete interface enabling the corresponding station to receive the wakeup signal and to issue a wakeup signal via two complementary stages.

In FIG. 3, the input stage is given overall reference 41a and the output stage is given overall reference 41b.

Naturally, it is also possible to envisage having stations fitted with only one of these stages, depending on the specific needs of the station in question.

The wakeup signal input stage comprises an input buffer given overall reference 42 associated with a resistor 43 connected in parallel with a capacitor 44, thus constituting an input that is active in the high state.

When the input is active, the wakeup request is shaped and triggers starting of the corresponding station.

The output stage 41b includes a semiconductor switch 10 given overall reference 45 represented in the form of a block and enabling a wakeup request to be forwarded to all of the other stations connected to the wakeup line.

This example thus describes the use of a both-way stage forming both a signal input and a signal output.

All of the stations may have a line interface with a signal input stage including an input buffer, while an output stage including a semiconductor switch member may be provided in only some of the stations.

It will then be understood that this structure presents a certain number of advantages insofar as only one line is used for transmitting the wakeup signal between the stations regardless of the number of distributed functions to be activated when the stations are in the standby state or the OFF state, for example, thereby presenting savings in terms of electrical architecture and network architecture.

Such a wakeup interface can also be implemented easily and widely since the hardware stage used is very similar to those that already exist in stations. Only specific software management needs to be created within each station, thereby representing savings in terms of industrialization and standardization.

Such a structure thus makes it possible to conserve the advantages of prior solutions, namely:

multiple activations are possible, i.e. one or more distributed functions can be executed without all of the stations being activated, since the stations that are not concerned by the distributed function(s) after a wakeup stage return to the standby state or the OFF state, while the other stations remain in the awake state in order to implement the function(s); and electricity consumption is optimized since only those stations involved in requested distributed functions are active, with the other stations being in the standby state or the OFF state.

As mentioned above, the system of the invention is equally applicable to stations in the standby state or in the OFF state.

A station is said to be in the OFF state when it is functionally inactive and its energy consumption is zero.

A station is said to be in the standby state when it is functionally inactive but continues to consume some minimal amount of electricity in order to power certain peripherals which, on standby, are independent of the digital core of the station, which digital core may be a processor, a microprocessor, or a microcontroller.

By way of example, a clock may constitute one such peripheral.

Naturally, other ways of implementing the system can be envisaged.

Thus, for example, the semiconductor switch may be formed by a MOSFET type member, but any other type of semiconductor switch such as a bipolar transistor, for example, could equally well be used.

The invention claimed is:

1. A system for waking up stations associated for implementing at least one distributed function and interconnected by an information transmission network in particular for a motor vehicle, in which the stations need to pass from a standby state or an OFF state to an awake state in order to exchange information relating to the distributed function, wherein all of the stations are connected to a single line for transmitting a station wakeup signal, wherein at least some of the stations include means for generating a wakeup signal on said line in order to cause the other stations to take up their awake state, and means for sending information relating to the distributed function over the information transmission network, and wherein at least some of the stations include means for analyzing the information on the information transmission network in order to determine whether they are concerned by the information and thus by the corresponding distributed function, so as to remain in the awake state or else return to the standby state or the OFF state.

2. A system according to claim 1, wherein the wakeup signal is in the form of an electrical pulse of predetermined duration as needed by the stations in order to become powered and to initialize under its command.

3. A system according to claim 2, wherein the stations include electricity power supply means including a self-hold mechanism enabling the stations to be held in the awake state if they are concerned by the distributed function.

4. A system according to claim 3, wherein all of the stations have a line interface comprising a signal input stage including an input buffer, and wherein at least some of the stations comprise an output stage including a semiconductor switch member.

5. A system according to claim 2, wherein all of the stations have a line interface comprising a signal input stage including an input buffer, and wherein at least some of the stations comprise an output stage including a semiconductor switch member.

6. A system according to claim 1, wherein all of the stations have a line interface comprising a signal input stage including an input buffer, and wherein at least some of the stations comprise an output stage including a semiconductor switch member.

* * * * *